(12) United States Patent
Maestro Garcia et al.

(10) Patent No.: US 10,834,291 B2
(45) Date of Patent: Nov. 10, 2020

(54) SELECTING COLOR STATES

(71) Applicant: Hewlett-Packard Development Company, L.P., Houston, TX (US)

(72) Inventors: Javier Maestro Garcia, Sant Cugat del Valles (ES); Jan Morovic, London (GB); Peter Morovic, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/088,897

(22) PCT Filed: Apr. 22, 2016

(86) PCT No.: PCT/EP2016/058984
§ 371 (c)(1),
(2) Date: Sep. 27, 2018

(87) PCT Pub. No.: WO2017/182093
PCT Pub. Date: Oct. 26, 2017

(65) Prior Publication Data
US 2019/0116291 A1    Apr. 18, 2019

(51) Int. Cl.
*H04N 1/52*    (2006.01)
*G06K 9/46*    (2006.01)
(Continued)

(52) U.S. Cl.
CPC ............. *H04N 1/52* (2013.01); *G06K 9/4652* (2013.01); *G06K 9/6212* (2013.01); *G09G 3/2059* (2013.01); *H04N 1/603* (2013.01)

(58) Field of Classification Search
CPC ........ H04N 1/52; H04N 1/603; G06K 9/4652; G06K 9/6212; G09G 3/2059
(Continued)

(56) References Cited

U.S. PATENT DOCUMENTS 7,054,038 B1 *   5/2006   Ostromoukhov ........ H04N 1/52
                                                 358/3.13
7,518,754 B2    4/2009   Cooper et al.
(Continued)

FOREIGN PATENT DOCUMENTS

CN       104956653       9/2015
EP       1912423 A1      4/2008
WO       WO-2016066202   5/2016

OTHER PUBLICATIONS

Jërëmie Gerhardt et al: "<title>Controlling the error in spectral vector error diffusion</title>", proceedings of spie, vol. 6493, Jan. 28, 2007 (Jan. 28, 2007), p. 649316, XP055094813.
(Continued)

*Primary Examiner* — Quang N Vo
(74) *Attorney, Agent, or Firm* — HP Inc. Patent Department

(57) ABSTRACT

From a statistical distribution of different color states in an image subdivided in pixels, pixel color states are selected by performing comparisons between predetermined values and values associated to per-pixel state probabilities. Errors (based on drifts between selected color states and per-pixel state probabilities) are diffused to per-pixel state probabilities of subsequent pixels.

20 Claims, 8 Drawing Sheets

(51) Int. Cl.
*G06K 9/62* (2006.01)
*G09G 3/20* (2006.01)
*H04N 1/60* (2006.01)

(58) Field of Classification Search
USPC ............ 358/3.05, 1.9, 1.15, 3.04, 3.03, 3.06
See application file for complete search history.

(56) References Cited

U.S. PATENT DOCUMENTS

| | | | |
|---|---|---|---|
| 8,233,194 B2 | 7/2012 | DePena et al. | |
| 8,681,382 B1 | 3/2014 | Mealy | |
| 9,218,645 B2 | 12/2015 | Shibata | |
| 2007/0177231 A1* | 8/2007 | Wang | H04N 1/40006 |
| | | | 358/504 |
| 2010/0214576 A1 | 8/2010 | Morovic | |
| 2012/0327477 A1* | 12/2012 | Edge | H04N 1/6033 |
| | | | 358/3.06 |
| 2015/0324996 A1* | 11/2015 | Rius Rossell | H04N 1/6072 |
| | | | 358/3.06 |

OTHER PUBLICATIONS

Li, P. et al., Tone Dependent Error Diffusion, (Research Paper), Oct. 31, 2001.

Morovič, J. et al. "HANS: controlling ink-jet print attributes via Neugebauer primary area coverages", in IEEE Trans Image Process, Feb. 2012; 21(2):688-96.

Peter Morovic et al: "Parawacs: color halftoning with a single selector matrix", Proceedings of 24-th Color and Imaging Conference (CIC24), Nov. 7, 2016 (Nov. 7, 2016) XP055329665.

Sharma, M. et al., An Analysis of Extended Visual Cryptography Using with Error Diffusion Half Toning Method, (Research Paper), 2014.

* cited by examiner

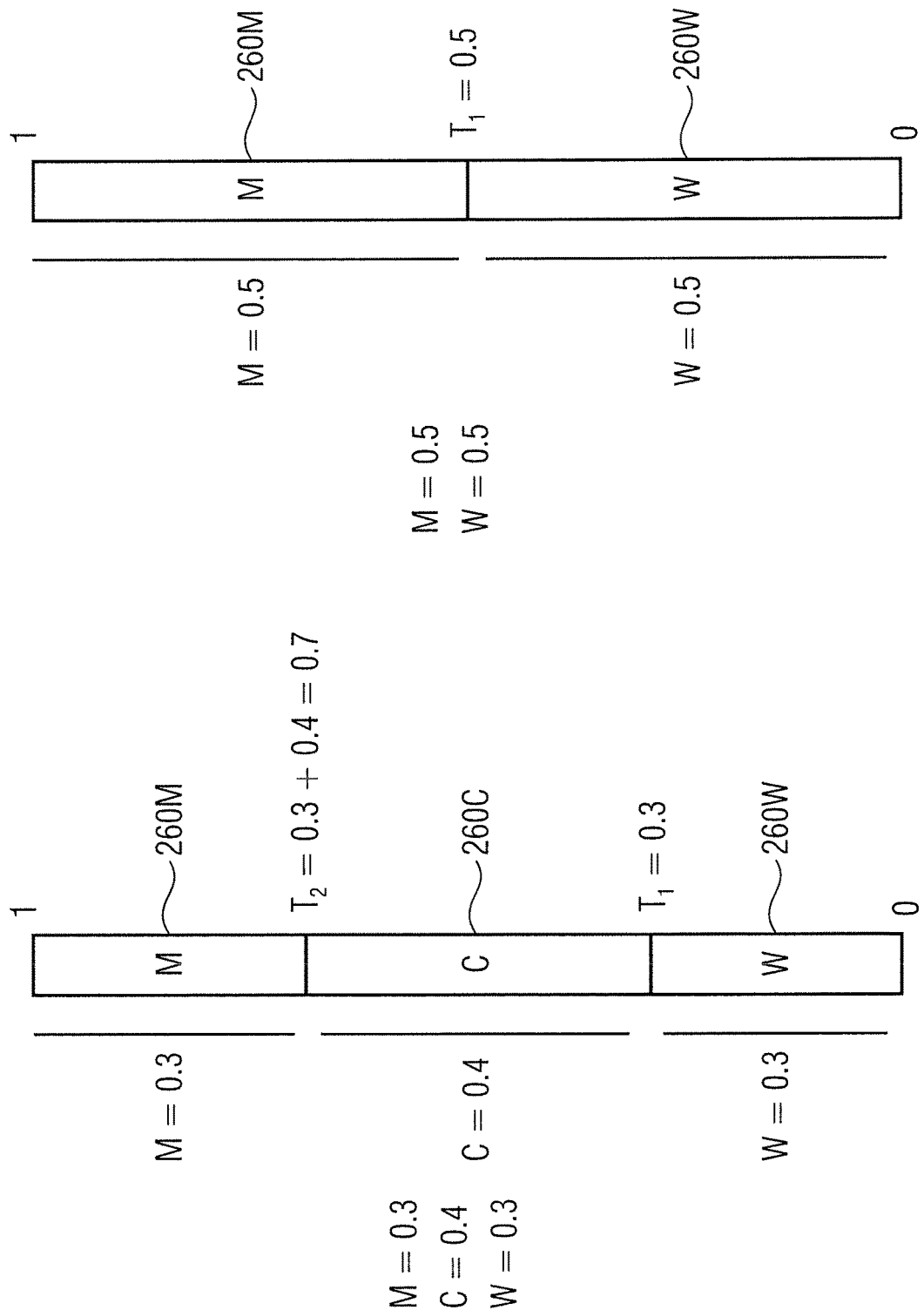

SELECTING COLOR STATES

BACKGROUND

Imaging systems may prepare images to be represented (e.g., printed and displayed). In imaging systems based on the Halftone Area Neugebauer Separation (HANS) pipeline, colors are treated as statistical distributions of color states. A per-pixel decision determines the final color state for the representation of each pixel.

DESCRIPTION OF THE FIGURES

FIG. 2*b* shows determinations of the color primaries according to one example of the present disclosure;

DETAILED DESCRIPTION

Figure 1:
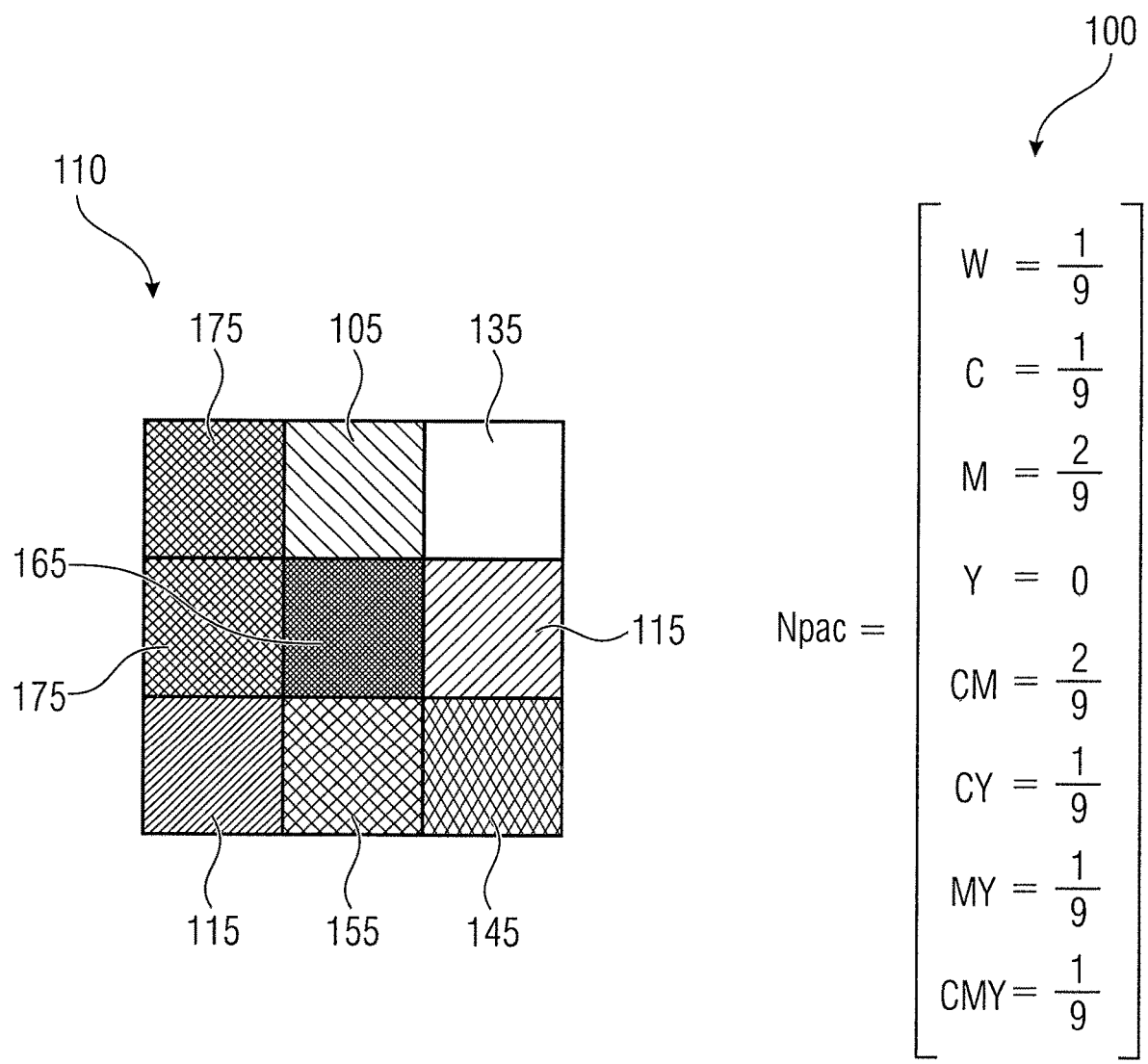
FIG. 1 shows an image based on a particular NPac vector according to one example of the HANS pipeline.

In the following description, for purposes of explanation, numerous specific details of certain examples are set forth. Reference to "an example" or similar language means that a particular feature, structure, or characteristic described in connection with the example is included in at least that one example, but not necessarily in other examples.

Hereinafter, examples of image representation are mainly directed to image printing (e.g., using ink-jet printers). However, the same concepts may be applied to image displaying (e.g., using an LCD or plasma display).

Print is normally intended as the result of a number of colorant of different colors (e.g., different inks) disposed on top of a substrate (e.g., paper). Ink amounts are chosen for each printable color.

Halftoning techniques may permit representing images, originally expressed as continuous tones/intensities (e.g., grey scales), by using a limited number of inks (e.g., only black and white). Human eyes tend to filter images. For example, humans perceive patches of black and white marks as some kinds of average grey when viewed sufficiently far away.

With the HANS pipeline, colors may be treated as statistical distributions of color states. An original image data can comprise color data as represented in a first color space (e.g., pixel representations in an Red-Green-Blue, RGB color space, represented as intensities). Then, the color data can be mapped from the first (RGB) color space to a Neugebauer Primary area coverage (NPac) color space, so that an image comprises pixels whose color values are defined in terms of NPac values that specify probability distributions for each particular color. An image on a substrate comprises a plurality of pixels or dots; each pixel can be assigned to a particular vector of probabilities. For the image, each NP is a "color primary": the image to be represented is made of a collection of multiple NPs (each having a particular probability of being assigned to each pixel).

In a binary (bi-level) color system (e.g., for a printer which can produce one single drop of one single ink for each pixel), an NP can be one of $2^k$ combinations of k inks within the printing system. If a printing device uses Cyan-Magenta-Yellow, CMY, inks, eight NPs are defined: C, M, Y, C+M, C+Y, M+Y, C+M+Y, and W (White or Blank indicating an absence of ink, and, therefore, the color of the support, which can be the color, often white, of the paper used for the print). It can also be possible to use multi-level printers, whose print heads are able to deposit N drop levels: an NP may be for example, one of $(N+1)^k$ combinations. Although certain printing devices are described with reference to colorant levels, any color mappings may be extended to other printing techniques, e.g. based on other printing fluids such as glosses and/or varnishes that may be deposited in a printing system and that may alter a perceived output color; these may be modelled as NPs.

Analogous concepts can be applied to other representing techniques (e.g. color displaying).

An NPac represents a distribution of Neugebauer Primaries (NPs), e.g., over an image or a unit area of the image. In order to define area coverages of NPs, NPac vectors can be used. For each pixel (and/or for each unit area of an image), a component of the vector is associated to a NP; the value of the component represents the probability for the pixel to be assigned to that NP.

FIG. 1 shows an example of NPac vector 100 for use in a CMY imaging system. An image here comprises a three-by-three pixel area 110 (the image can be composed with other images to obtain an image composition made of several pixel areas). A unit area may be defined as a particular number of printer pixels (e.g. as defined by dot resolution).

In the example of FIG. 1, each pixel has the same NPac vector 100 (i.e., for each pixel NP, the probability of taking a particular NP is always the same). The NPac vector 100 defines the probability of eight NPs; for example, in this case: 1/9 for White (W) (135); 1/9 Cyan (C) (105); 2/9 for Magenta (M) (115); 0 for Yellow (Y); 2/9 for Cyan+Magenta (CM) (175); 1/9 for Cyan+Yellow (CY) (145), 1/9 for Magenta+Yellow (MY) (155); and 1/9 for Cyan+Magenta+Yellow (CMY) (165). The pixel area in FIG. 1 may be different in case of a different juxtaposition of the NPs.

When halftoning in a HANS pipeline, a per-pixel determination of the actual color to be printed (or displayed) is made. This determination may be important, as it impacts the image quality. Halftoning can generate unwanted artefacts as a result of a "bad" distribution of drops. Further, there arises the risk of the visibility of lines and edges (which are in general portions of images that are considered important) being reduced.

Figure 2A:
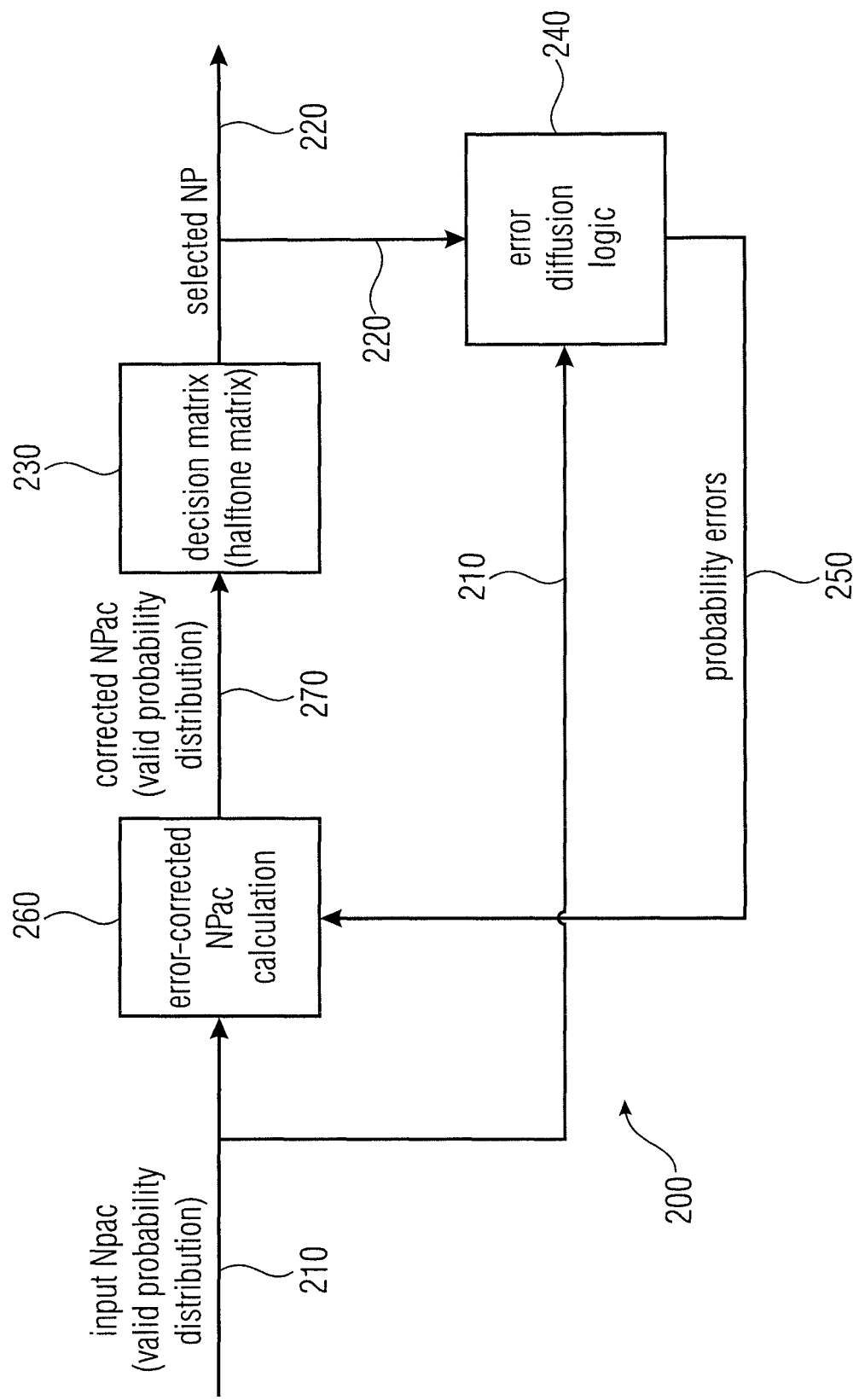
FIG. 2*a* shows a halftoning system according to one example of the present disclosure.

FIG. 2*a* represents a halftoning system 200 for the HANS pipeline. From a statistical distribution of different color states in an image subdivided in pixels, pixel color states are selected by performing comparisons between predetermined values and values bound to per-pixel state probabilities. Further, errors are diffused to per-pixel state probabilities of subsequent pixels (the errors based on drifts between selected color states and per-pixel state probabilities).

The predetermined values can be random values. The random values can be obtained by a matrix with values unrelated to values of the pixels, their per-pixel state probabilities, and the errors.

The input value 210 can be a statistical distribution of color states for multiple pixels of an image. For example, for each pixel of the image (which can be the image of FIG. 1), a probability can be expressed as an NPac vector. The values of the NPac do not refer, as such, to particular color intensities. A pixel of the input 210 dies not have a pre-defined color: only a probability of each color primary is defined.

At block 230, the pixel value of the image to be printed (or displayed) can be determined. For each pixel (e.g., on the basis of its position in a Cartesian coordinate system), the state probability (e.g., NPac) can be compared with a predetermined value (e.g., a randomly pre-defined value). The predetermined value can be taken from a matrix.

It can be possible to perform a so-called matrix halftoning, by choosing a matrix suitable for halftoning. For example, it can be possible to use a method known as PARAWACS halftoning.

The NPac of each pixel can be compared to a value of a matrix of NP selection probabilities (blue noise, green noise, AM, etc.).

It is also possible to define, consecutive adjacent numerical intervals, each associated to a NP, the length of each interval being proportional to the NPac of the NP for that pixel. It is also possible to perform a comparison step in which it is determined in which interval a numerical value of a matrix (e.g., a PARAWACS matrix) falls.

Where provided, the matrix can be tuned (e.g., through a user's selection) to favour certain tones. The matrix can also be input by the user or by a suitable software.

The output value represented by 220 is the selected color state for the pixel (e.g., the final ink than has to be used).

In order to determine the color of each pixel, the following determination strategy can be followed.

In case of three NPs (White, Cyan, Magenta), a White NP can have NPac=W (with 0<W<1), a Cyan NP can have NPac=C (with 0<C<1), and a Magenta NP can have NPac=M (with 0<W<1 and W+C+M=1). It is possible to define different numerical interval, each associated to a NP. In order to define the intervals, it is possible to define thresholds, such as:

$$T_1 = W,$$

$$T_2 = W + C = 1 - M.$$

The intervals can be defined in terms of thresholds:
a first interval (associated to the White NP) can be $[0, T_1)$;
a second interval (associated to the Cyan NP) can be $[T_1, T_2)$; and
a third interval (associated to the third NP) can be $[T_2, 1]$.

The NP to be used for each pixel is determined on the basis of the NPacs and the predetermined values of the decision matrix: in particular, it is determined in which interval the predetermined value (e.g., the randomly chosen value, e.g. selected from a matrix) is positioned.

It is also possible to perform subtractions between a predetermined value (e.g. a matrix value) and the threshold. It is possible to select the highest positive value between the difference values obtained by the subtractions. For example, if the predetermined value of the matrix is x, the following three values (bound to per-pixel state probabilities) can be calculated:

$$y_1 = x, \text{ (associated to the White NP)}$$

$$y_2 = x - T_1, \text{ (associated to the Cyan NP)}$$

$$y_3 = x - T_2 \text{ (associated to the Magenta NP)}$$

As a result, it is possible to select, as the output 220, the NP which is associated to the lowest value (between $y_1$, $y_2$, and $y_3$) after having discarded the negative values.

An example is provided in FIG. 2b-1, in which different intervals 260W, 260C and 260M are respectively associated to White, Cyan and Magenta. If the probability of the pixel being white is W=0.3, the probability of being cyan is 0.4, and the probability of being magenta is 0.3, and the predetermined value (e.g., chosen by a matrix) is x=0.4, the following thresholds $T_1$ and $T_2$ can be defined:

$$T_1 = W = 0.3,$$

$$T_2 = W + C = 0.3 + 0.4 = 0.7.$$

The three intervals are:
the first interval (associated to the White NP) being [0, 0.3);
the second interval (associated to the Cyan NP) being [0.3, 0.7); and
the third interval (associated to the third NP) being [0.7, 1].

The following values are calculated:

$$y_1 = x = 0.4, \text{ (associated to the White NP)}$$

$$y_2 = x - T_1 = 0.4 - 0.3 = 0.1, \text{ (associated to the Cyan NP)}$$

$$y_3 = x - T_2 = 0.4 - 0.7 = -0.3. \text{ (associated to the Magenta NP)}$$

The determined color will be Cyan, as $y_2 = 0.1$ is the lowest value between the positive values ($y_3$ being discarded in view of being negative).

The proceedings above can be generalized for any number of color primaries.

An example is provided in FIG. 2b-2 for a bicolor system (Magenta, White), in which different intervals 260W and 260C are defined by thresholds $T_1$. In this case:
T=W=0.5;
the first interval, associated to White NP, being [0, $T_1$), that is [0, 0.5);
the second interval, associated to the Magenta NP, being [$T_1$, 1], that is [0.5, 0];
$y_1 = x = 0.5$; and
$y_2 = x - T_1 = 1 - 0.5 = 0.5$.

Other algorithms can be used to determine the interval in which the predetermined value (e.g., matrix value) lies.

If the system 200 is intended to operate as a bi-color system (e.g. only "Black" ink vs. "No Ink"), a color state of each pixel can be also determined at block 230 using a determination such as:
If the predetermined value is greater than the NPac of the pixel, then the selected NP is "Black"; otherwise, the selected NP is "No Ink".

The output 220 can be such that only one color primary (NP) is defined for each pixel (which can therefore be printed using a respective ink). Hence, for each pixel and for each color primary, a drift can be defined between the probability and the selected color state. It is therefore possible to obtain an error which can be fed back to modify the NPacs of subsequent pixels whose NP is still to be determined.

Block 240 implements an error diffusion logic input by the original NPac 210 and the selected color state 220. Block 240 outputs probability error information 250 which can be used as feedback for the determination of the color state of subsequent pixels (e.g., neighborhood pixels).

Block 260 (which can be implemented using a storage device, a register, a buffer, and similar) implements an error-corrected (or error-accumulated) NPac calculation in which the probability error information 250 can be diffused to the original NPacs 210, thus forming (error-corrected) modified NPacs 270, which can be input to block 230.

At block 260, probability error information 250, calculated on the basis of the drift of the selected color primary of a pixel, may be added to NPacs 210 of subsequent (neighborhood) pixels. For subsequent pixels, the probability of non-selected primaries can be increased with respect to the original probability.

For a given pixel, neighborhood pixels can be pixels that are adjacent to the given pixel, and/or pixels that are placed within a predetermined distance (e.g., counted in pixel numbers) from the given pixel. It can also be possible to take in consideration the direction (e.g., horizontal or vertical) and/or the versus (e.g., top-down, bottom-up, left-right, or right-left). In general, pixels which have been previously compared at block 230 (i.e., their color primaries have already been selected), are not "subsequent pixels" and do not need error diffusion, even if they are in the neighborhood.

For example, the errors can be accumulated by modifying the intervals (e.g., intervals 260W, 260C, and 260M of FIGS. 2b-1 and 2b-2), for example by modifying the thresholds (e.g., $T_1$, $T_2$, and any other threshold that is to be defined). By expanding an interval associated to a previously non-selected NP (e.g. by decreasing the lower limit and/or by increasing the upper limit of the interval) its probability is increased (e.g., with respect to the input NPacs 210). By reducing the intervals of the previously selected NPs, their probabilities is decreased.

Blocks 240 and 260 can cooperate to implement an error diffusion algorithm. For example, an algorithm based on the Floyd and Steinberg theory can be implemented. An error occurring in a pixel at position (i, j) of an image can be weighted (e.g., by 7/16) and added to a neighborhood pixel at position (i+1, j). At the same time, the error can be weighted (e.g., by 1/16) and added to a neighborhood pixel at position (i, j+1). NPacs values can be modified by taking in consideration these weights. Other error diffusion algorithms can be implemented.

In some examples, probability errors output by the error diffusion logic 240 may also be used to modify the values of the matrix. Accordingly, the arrow 250 may be directed to the block 230, and the block 260 may also be unnecessary (the input 210 may be directly fed to the decision matrix 230).

The operations above can be iterated until the color primary for the last pixel of the image is calculated.

The first pixel can act as seed: its selection is based on the original NPac 210 and on the predetermined value (e.g. random value). For the other pixels, the selection of the color primary is based on the original NPac 210, on the numerical value of the predetermined value, and on the errors of at least one of the previously calculated pixels. The choice of the seed can be random, based on a user's selection, or predefined (e.g., the seed may be the first pixel on the left of the highest line).

Figure 3:
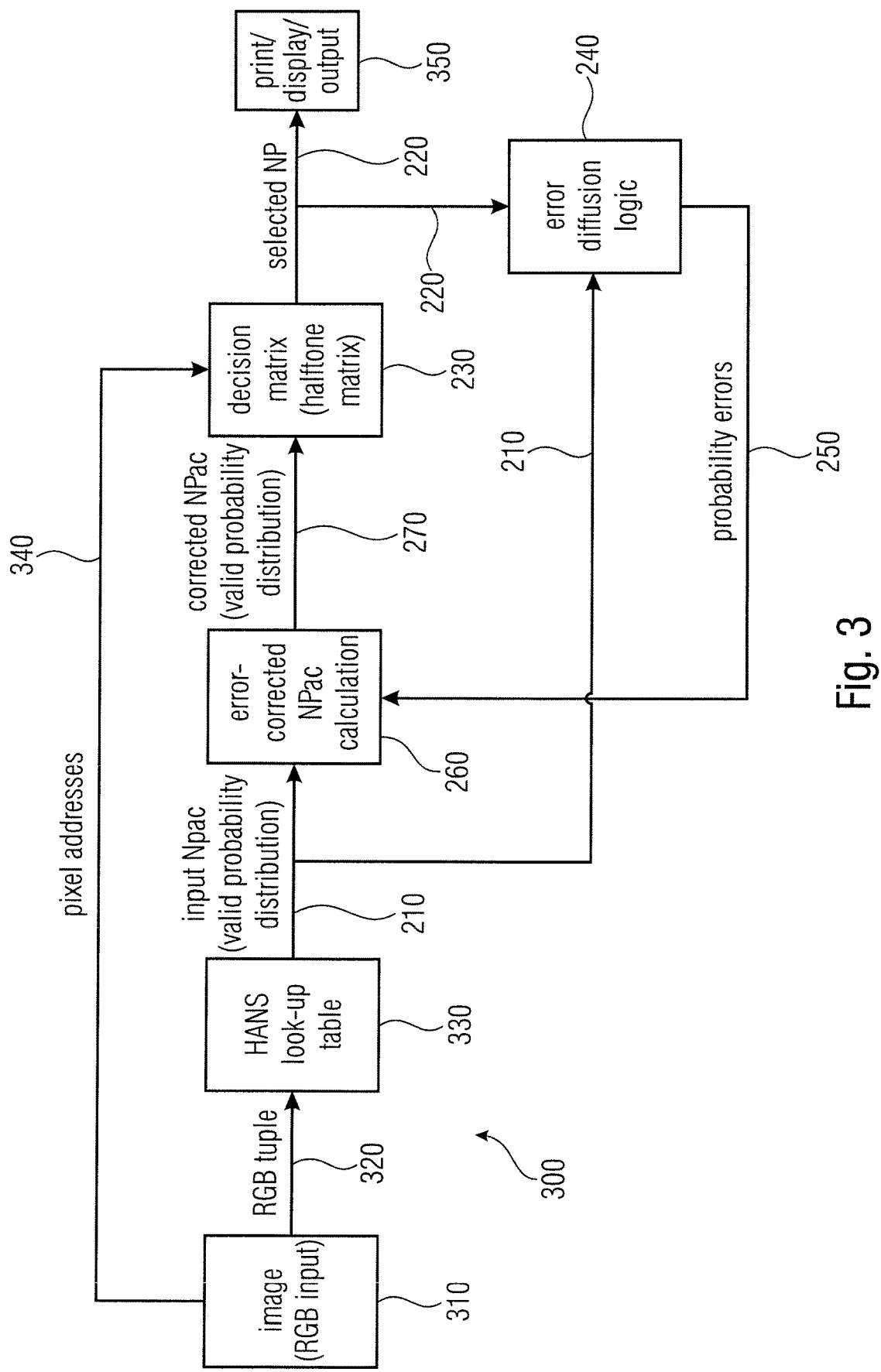
FIG. 3 shows an imaging system according to one example of the present disclosure.

FIG. 3 shows an imaging system 300 for representing pixels using the halftoning system 200 of FIG. 2a (the reference numerals of the elements of system 200 being repeated). An original image 310 (e.g., a bitmap) can be a matrix of pixels in which color states are mapped by color intensities (e.g., using RGB tuples which are conceptually indicated by 320) for each color primary. Each color primary can be Red, Green, and Blue (the same can apply to other color systems, such as CMY or grey-scale). The color state of each pixel can be represented by a component of the RGB tuple, expressed, for example, as an integer between 0 and 255 (e.g., the higher the value of the integer, the higher the intensity of the component).

At block 330, the color intensities are mapped to obtain the NPacs 210. Look-up tables that convert color tuples into probabilities can be used.

Arrow 340 indicates pixels addresses, e.g., expressed as coordinates (i, j), which are used for determining the predetermined values to be used at block 230. For example, the predetermined value at coordinates (i, j) of the decision matrix is used for carrying out the comparison at block 230 for the pixel at coordinates (i, j). Matrix operations can be performed to match the dimensions of the image to be halftoned and the decision matrix.

Block 350 can indicate a printing activity, e.g. the print of the image 310 (after having been halftoned) using a printer (e.g., an ink-jet printer) in which for each pixel a drop of colored ink is chosen according to the selected color primary (NP). Block 350 can also indicate a displaying operation, in which a monitor displays different pixels according to the selected color primaries. Block 350 can also indicate a storage operation, through which a matrix of pixels is stored, the colors of the pixels being chosen as the color primaries selected at 230.

Figure 4:
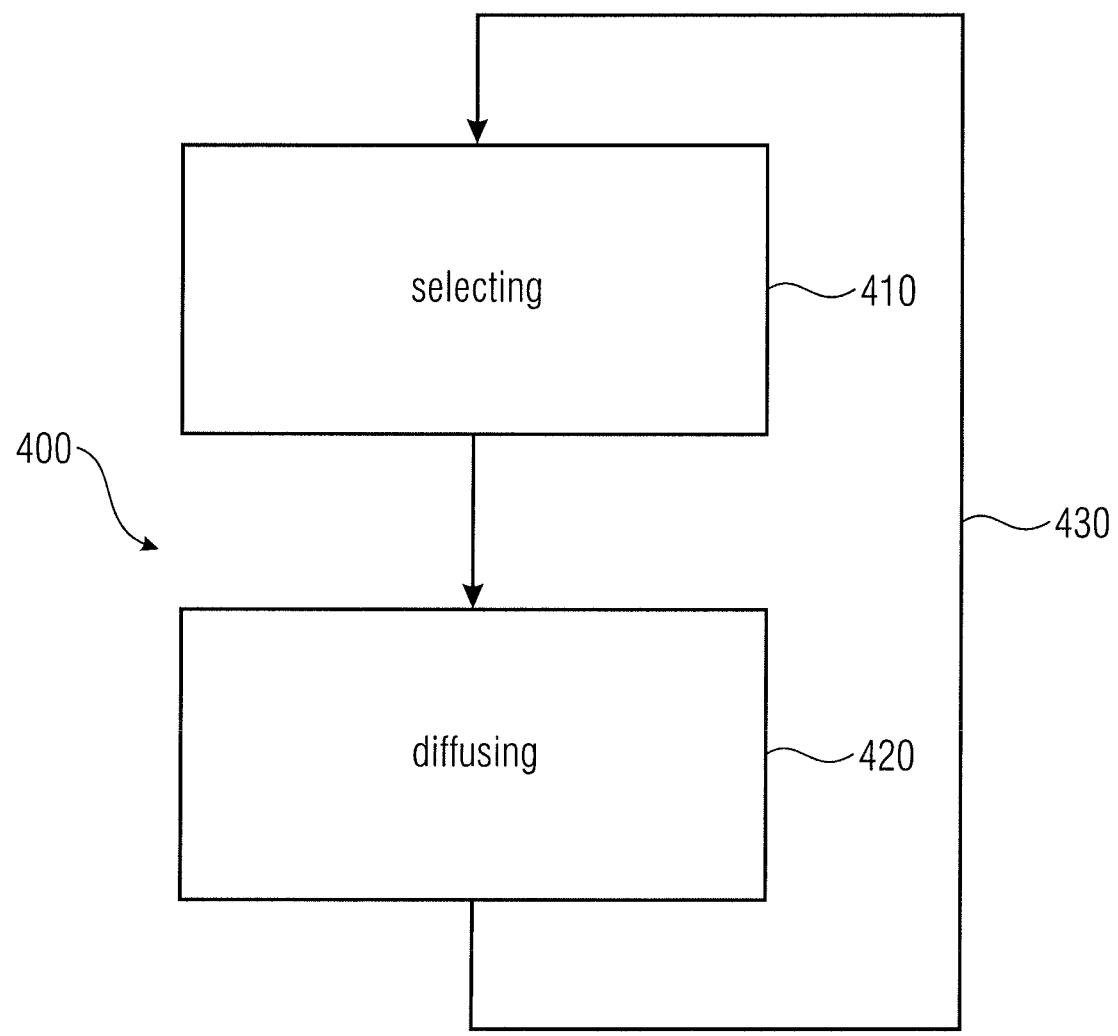
FIG. 4 shows a halftoning method according to one example of the present disclosure.

FIG. 4 shows a diagram of a method 400 based on the following steps:
- (step 410) from a statistical distribution of different color states in an image subdivided in pixels, selecting pixel color states (e.g., 220) by performing comparisons (e.g., at 230) between predetermined values (e.g., matrix values) and per-pixel state probabilities;
- (step 420) diffusing errors (e.g., 250) to per-pixel state probabilities of subsequent pixels, the errors based on drifts between selected color states (e.g., 220) and per-pixel state probabilities (e.g., 210).

Arrow 430 indicates the iterations of the error-diffusion feedback for the subsequent pixels.

The strategies of systems 200 and 300 can be used to perform the method 400.

Figure 5:
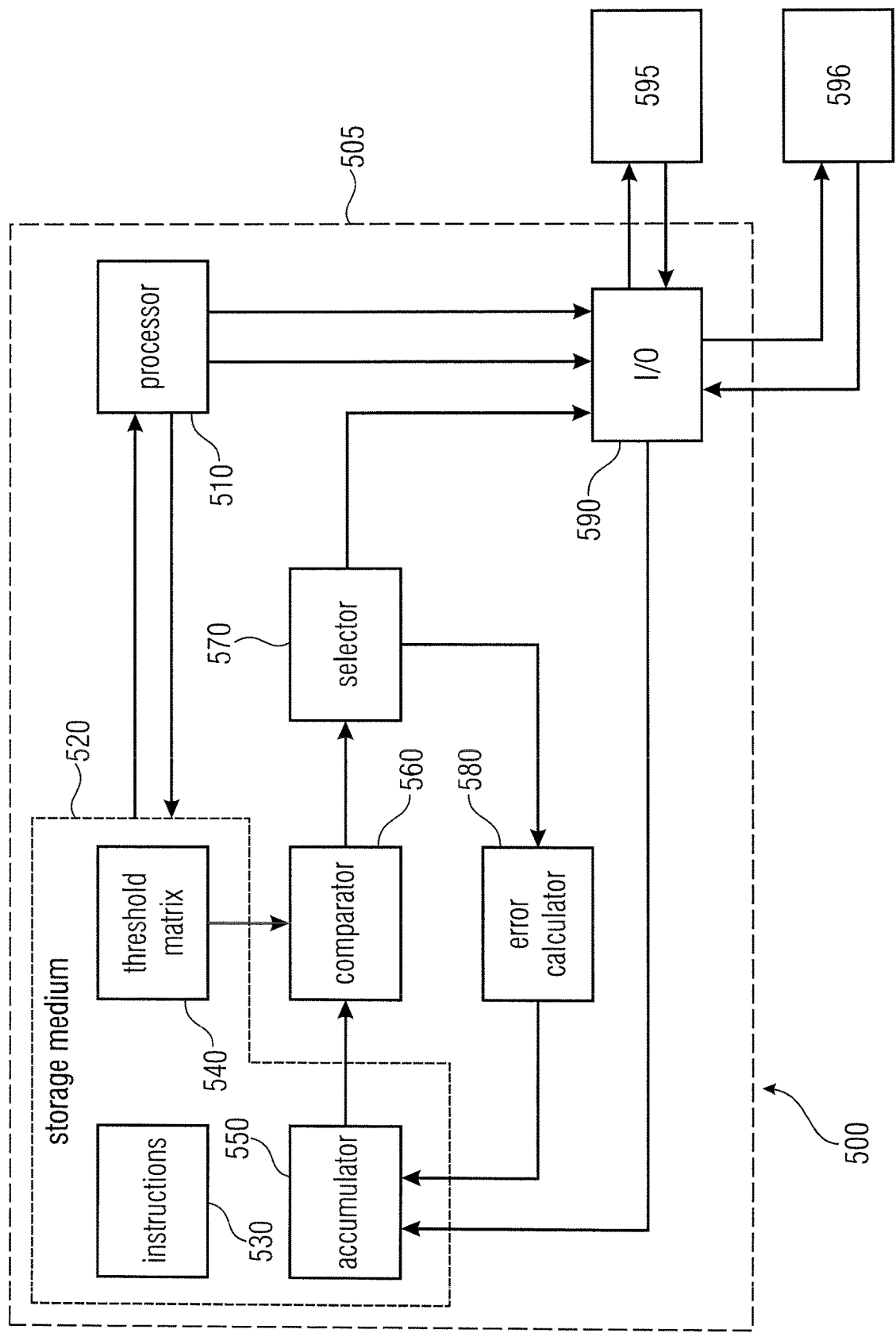
FIG. 5 shows a halftoning system according to one example of the present disclosure.

FIG. 5 shows a system 500 comprising a device 505. The device 505 comprises a processor 510 (e.g., the processor of a computer) and a processor-readable storage medium 520 comprising computer readable storage instructions 530 that, when executed by the processor 510, cause the processor 510 to implement any of the operations of the systems 200 and 300 and/or to operate according to the method 400. The process-readable storage medium may be a non-transitory medium.

The storage medium 520 can also comprise memory elements storing a decision matrix (e.g., a PARAWACS matrix) 540. The storage medium 520 can also comprise memory elements 550 acting as accumulator, e.g., containing modified NPacs 270 (e.g., to be used to diffuse errors at block 260). The instructions 530 can also be used to control a comparator 560, input by the values of the decision matrix 540 and the accumulator 550, and a selector 570, which chooses, for each pixel, the color state (e.g., NP) for its final representation on the basis of the comparison carried out by the comparator 560 (e.g., blocks 560 and 570 can cooperate to embody block 230, e.g., by determining in which interval the NPac is positioned).

The accumulator 550 can contain, for example threshold values (such as values $T_1$, $T_2$, as discussed above) to determine intervals (e.g., intervals 260M, 260C, 260M as discussed above) in which the values of the decision matrix 540 are positioned. The accumulator 550 can also contain the NPac probabilities (e.g., in the form of a NPac vector) for each pixel.

The instructions 530 can be used to control a feedback block (error calculation block) 580 (which can embody the block 240).

An input/output element 590 can be used to input the NPac values (e.g., values 210) and to output the result (e.g., a matrix in which pixels are mapped by the selected color state 220). Elements 560, 570, 580 can be implemented in hardware and software by using the necessary components: the fact that they are represented as being out of the storage medium 520 is merely explicative, as they generally involve both memory and processing capacities.

The system 500 can comprise a printer 595 which prints (e.g., by applying an ink drop on a paper support) the image according to the NP selected for each pixels. The system 500 can comprise an electronic display 596 which displays the image (e.g., by displaying, for each pixel of the electronic display, the corresponding selected NP). Printer 595 and electronic display 596 are examples of output devices, which are to represent the images in a format that can be appreciated by a human.

The system 500 can also be a printer itself, block 595 indicating a controller component of the printer, and a print unit being represented by 595.

The system 500 can also be a display itself, block 595 indicating a controller component of the display, and block 596 indicating the elements that physically visualize information.

Figure 6:
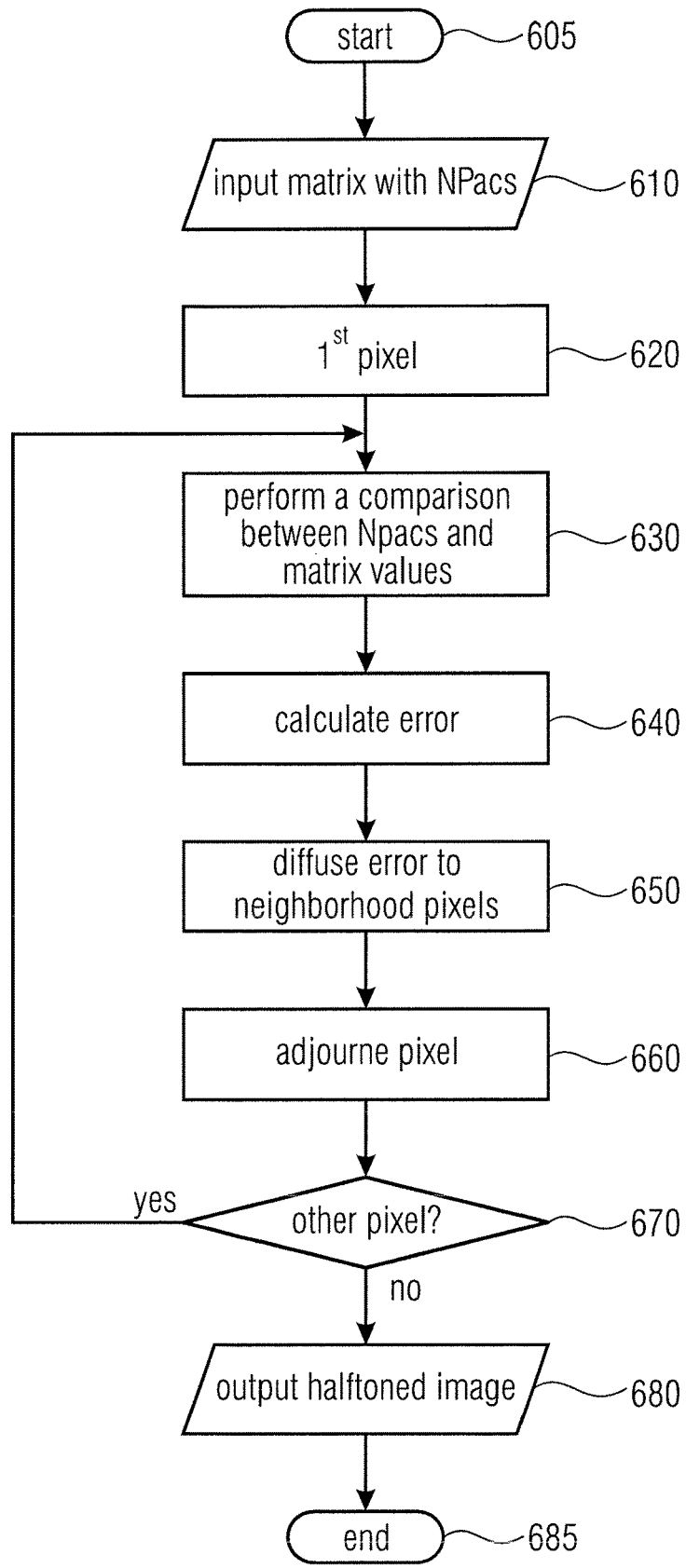
FIG. 6 shows a halftoning method according to one example of the present disclosure.

FIG. 6 shows an algorithm 600 that can be used to operate with one of the systems 200, 300 and 500 and can embody the method 400. The algorithm starts at 605. A matrix with NPac values for different pixels can be input at 610 (e.g., to obtain input 210 and/or the values stored in the accumulator 550).

At 620, a first pixel (seed) can be chosen for computation. Then, iterations are performed, in turn, all the pixels of the image.

At 630, the NP to be represented (printed or displayed) is selected. A comparison operation can be carried out. For example, it is determined in which interval (e.g., 260W, 260C, 260M discussed above) a predetermined value (e.g., matrix value randomly chosen) is positioned. Other determination strategies are possible. The NPac of the pixel can be compared with predetermined thresholds stored in storage means (e.g., in the memory elements by which matrix 540 is stored).

At 640, an error can be calculated, e.g., from a drift between the value of the selected NP and the original NPac.

At 650, the error can be diffused to subsequent (neighborhood) pixels (e.g., by using the block 260 and/or the accumulator 550).

At 660, the pixel can be adjourned. If the pixel address is (i, j), the pixel at the address (i+1, j) and/or the pixel at the address (i, j+1) and/or the pixel at the address (i+1, j+1) can be chosen (other paths can be chosen).

At 670, it can be checked if all the pixels have been computed (and a final NP has been selected for each pixel), e.g., by comparing if i and j are over the dimensions of the image. If not all the pixels have been computed, steps 630-660 are repeated for the adjourned pixel.

Otherwise the iterations are concluded. At 680, the halftoned image is output, either to a printer or to a display, or simply saved on a storage means. The algorithm ends at 685.

Figure 7:
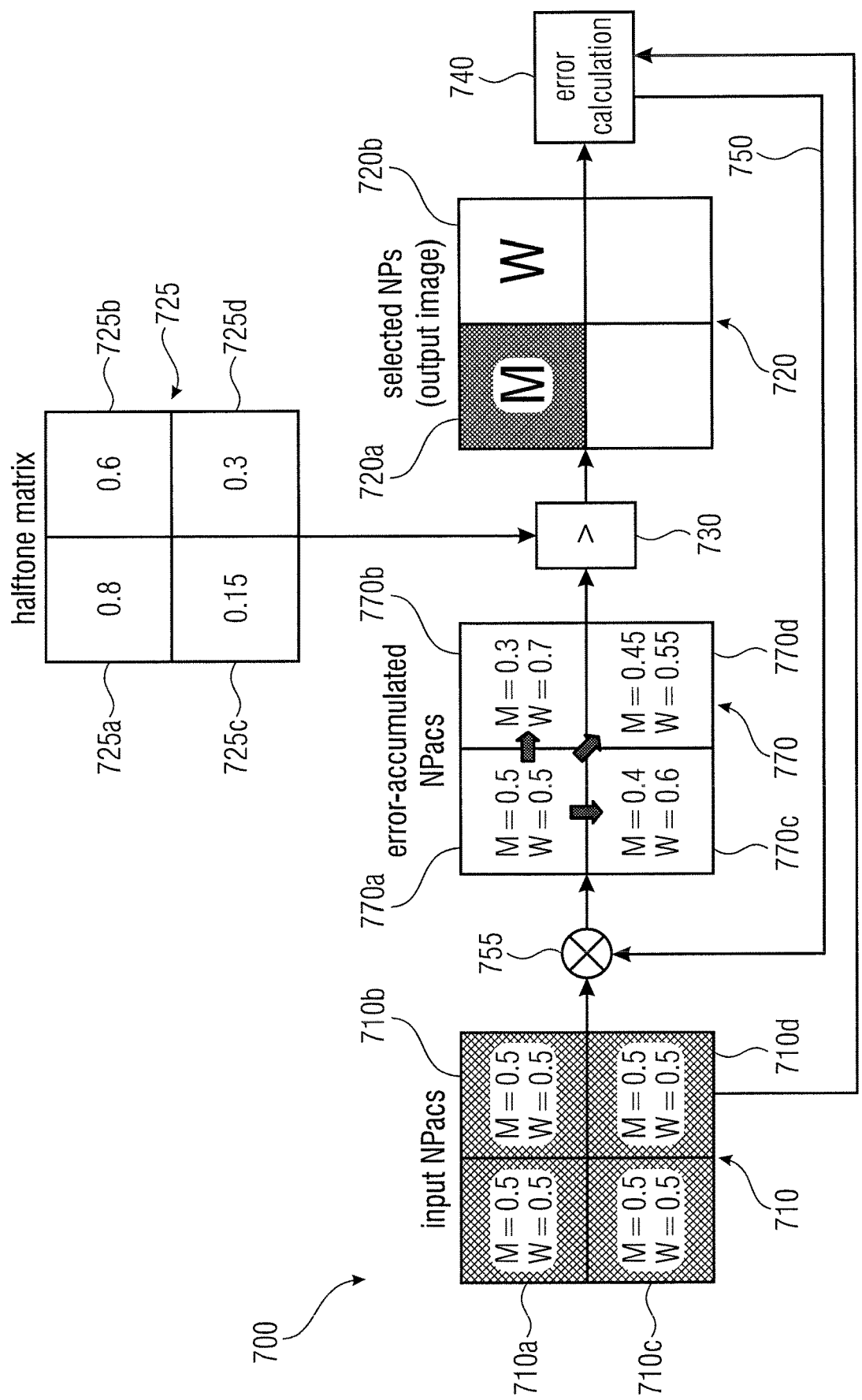
FIG. 7 shows a halftoning operation according to one example of the present disclosure.

FIG. 7 shows a diagram 700 to further illustrate the halftoning operations. An input NPac matrix 710 (which can embody the input 210) can be formed by values 710a, 710b, 710c, 710d, each of which refers to a pixel. The values of the input NPac matrix 710 are incremented at 755 with error information values 750 to provide a modified NPac matrix 770 (whose values can embody the values 270 and the values stored in the accumulator 550). At 730 (which can embody block 230), the modified NPac matrix 770 (formed by values 770a, 770b, 770c, 770d, each of which corresponds to respective pixels of the input NPac matrix 710), can be compared to a decision matrix (halftone matrix). In particular, the comparison can be performed between the values of a predetermined halftone matrix 725 (which can be formed by the predetermined values 725a, 725b, 725c, 725d, and can embody the decision matrix, e.g., the matrix stored by the memory element 540) and values of the modified NPac matrix 770. On the basis of the comparison performed at 730, an output matrix 720 (which can be formed by values 770a, 770b, 770c, 770d and can embody the output 220) can be defined. At 740 (which can embody the error diffusion logic 240), an error Information 750 can be calculated of the basis of the drift between the values of the NPac matrix 710 and the values of the output matrix 720.

The NPac matrix 710 represents an image (or an image area) to be halftoned (in this case a 2×2 pixel image). Here, the imaging system is bicolor: each pixel can be represented either as Magenta (one ink drop) or as White (no ink at all). Therefore, two NPs are to be defined. It is necessary to determine, for each pixel, whether the NP is to be represented as Magenta or White.

Each pixel of the image to be represented has a probability of taking a particular NP which is mapped by NPac vectors which form elements 710a, 710b, 710c, 710d of the matrix 710. In this particularly case, the NPac vector of each of the four pixels of the Image is {M=0.5, W=0.5}. It is possible to assume that pixels of the original image should ideally have a color which is intermediate between White and Magenta (which cannot be reached in the present bicolor system).

Hence, the halftoning technique is implemented to define NPs for the pixels of the image so that human eye understands them as being part of an image area having the intended intermediate color (or having color gradations that appear natural).

In the present example, the comparison performed at 730 can be a comparison between a predetermined value in the decision matrix 725 and the White component of the corresponding NPac vector in the modified matrix 770: if the predetermined value is greater than the White component, the corresponding pixel takes a Magenta color; otherwise, the pixel takes White color. A PARAWACS method can also be used.

In this case, all pixels present a 50% White/Magenta distribution. A random approach chooses White for some of the pixels, and Magenta for some others. Otherwise, using a deterministic approach, all the pixels 710a, 710b, 710c, 710d may end having the same color.

The first pixel (seed) of the original image has no prior error information. Hence, the first pixel gets halftoned without any additional error (i.e., the NPac value 770a of matrix 770 is the same of the NPac value 710a of input matrix 710, as the error added at 755 is zero). At 730, the NPac value of pixel 770a is compared to the predetermined value 725a of the decision matrix 725. As 0.8>0.5 (the predetermined value 725a is greater than the White component of the NPac vector in 770a), the output value 720a is selected to be Magenta.

The incurred statistical error is calculated on the basis of the drift between the Magenta color chosen for the first pixel and the NPac value 710a. An error information 750 is calculated at 740 (e.g., by using algorithms using predetermined weights) and propagated to the neighboring pixels by adding, at 755, the error information 750 (or a modified versions thereof) to the values 710b, 710c, 710d of the input matrix 710, to obtain modified values 770b, 770c, 770d in the modified (error-accumulated) NPac matrix 770. For example, the White component of value 770b has been increased to W=0.7 (and correspondingly the Magenta component has been decreased to M=0.3); the White component of value 770c has been increased to W=0.6 (and correspondingly the Magenta component has been decreased to M=0.4); and the White component of value 770d has been increased to W=0.55 (and correspondingly the Magenta component has been decreased to M=0.45). As indicated by the arrows from element 770a to elements 770b-d, the error propagates from a first pixel to subsequent pixels.

It can be noted that, by virtue of a pixel having been associated to a particular NP, the probability for subsequent pixels to take the same NP can be, in general, decreased with respect to their previous probabilities.

With particular reference to input pixel 710b (which, in respect of pixel 710a, is a subsequent pixel), after error diffusion at 755 the White component of the NPac vector in the modified matrix 770 results 0.7. This value is compared at 730 with the predetermined value 725b, whose predefined value (in particular, chosen randomly, independently from the calculated errors) is 0.6. As 0.6<0.7 (i.e., the value of predetermined value 725b is less than the White component of the vector 770b), the resulting NP is White at 720b.

It is noted that, without error diffusion (e.g., without blocks 740, 755, 770), the determination performed at 730 for pixel 710b may have to been Magenta, due to the original NPac probability (W=0.5) being lower than the predetermined value 0.6.

The process is repeated for each pixel until the image is fully halftoned.

The explanations above have been provided by taking in consideration a comparison between the matrix values 725a-725d and the White NPacs of block 770. However, it may also be possible to define different intervals for different NPs as in FIG. 2b-2. For example, block 770a may present:

a first interval (associated to White) which may be [0, 0.5), with threshold $T_1$ being equal to W=0.5.

a second interval (associated to Magenta) which may be [0.5, 1].

At block 730, it may have been determined that the predetermined value 725a of the halftone matrix is 0.8, which is in the second interval (associated to Magenta). Therefore, the resulting pixel (in block 720a) may have been white.

The error calculated at block 740 may have been spread through block 755 to elements 770b-770d. For value 770b, the error accumulation may have been so that:

the first interval (associated to White) may have been expanded to [0, 0.7), with threshold $T_1$ being increased to 0.7.

the second interval (associated to Magenta) may have been restricted to [0.7, 1], with $T_1$ being increased to 0.7.

At block 730, it may have determined that the matrix value 725b (which is 0.6) is in the second interval (associated to White). Therefore, the resulting pixel (in block 720b) may have been white.

After having carried out one of the methods above for an image formed by several pixels (e.g., hundreds or thousands of pixels) or an image formed by the composition of a multiplicity of unit areas, a human can have the impression of the area formed by the halftoned pixels having an intended color (e.g., the intended intermediate color between White and Magenta discussed).

Notably, the methods and systems of the present disclosure can be applied to any image: e.g., an image having thousands of pixels as well as a unit area (which is also an image) and which can be composed with other unit areas to form a final image (e.g., an image composition).

Several advantages are implied by such halftoning strategies. In particular, smooth patterns can be obtained. Further, several artefacts can be avoided.

This halftoning is particularly appropriated for preserving edges and lines. Correct printing of lines is critical for the technical market, and it is a common problem when halftoning. Not rendering perfect lines is a major problem for any imaging system.

The statistics of the color distributions according to the HANS pipeline are not distorted; basically, the present halftoning does not cancel the beneficial properties of the color distributions obtainable with the HANS pipeline.

It appears that the preservation of lines and edges is mainly due to the use of the error diffusion. However, without the comparison with a decision matrix, the error diffusion alone may also be the source of artefacts by virtue of its determinism (in particular when representing light tones).

Further, the error diffusion alone may need a large image to reach a stable state when representing light tones, leading to missing parts and very visible patterns that may generate grains. The comparison with a decision matrix reduces the impact of these disadvantages: any level of randomness can be chosen for the decision matrix, hence implying the possibility of choosing any NP for any pixel, despite a very low probability.

Hence, the advantages of the HANS pipeline are not cancelled by the halftoning, and particularly natural images can be represented when printed or displayed.

The present halftoning can be seen as being based on an error diffusion strategy in which the most probable state of a pixel is not necessarily chosen. Instead, a state is chosen on the basis of the probability distribution of the original NPac matrix, the error diffused in feedback and the values of the decision matrix (e.g. a PARAWACS matrix).

Error diffusion alters the original NPacs, and a comparison with a predetermined value completes the choice for a given pixel. This procedure may add randomness to error diffusion in a way that is determined by a pre-defined matrix, solving most artifacts of the light tones, while still rendering perfect lines.

Further benefit of the present halftoning may lie in performing error diffusion on an already smooth distribution of states given by a decision matrix.

The present halftoning has the potential of combining good line reproduction avoiding the occurrence of missing parts or artifacts in light tones.

With the present halftoning the output halftone image preserves the expected NP area coverage statistics, thus maintaining the advantages of HANS pipeline.

By halftoning in the HANS pipeline, all the NPs can be computed simultaneously. There is no need of using different cycles for different color primaries.

The discussion above is open to the use of arbitrary error diffusion (various path-based approaches, various error distribution strategies, etc.) in combination with arbitrary threshold-based halftoning algorithms.

Furthermore, the present halftoning also directly applies to 3D halftoning (e.g. by using PARAWACS3D and 3MED) to avoid 3D-artefacts.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some examples, at least some of the most important method steps may be executed by such an apparatus.

Depending on certain implementation requirements, examples can be implemented in hardware. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some examples comprise a data carrier having electronically readable control signals, which are capable of cooperating with a programmable computer system, such that one of the methods described herein is performed.

Generally, examples can be implemented as a computer program product with a program code, the program code being operative for performing one of the methods when the computer program product runs on a computer. The program code may for example be stored on a machine readable carrier.

Other examples comprise the computer program for performing one of the methods described herein, stored on a machine readable carrier.

In other words, an example of method is, therefore, a computer program having a program code for performing one of the methods described herein, when the computer program runs on a computer.

A further example of the methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further example of the method is, therefore, a data stream or a sequence of signals representing the computer program for performing one of the methods described herein. The data stream or the sequence of signals may for example be configured to be transferred via a data communication connection, for example via the Internet.

A further example comprises a processing means, for example a computer, or a programmable logic device, configured to or adapted to perform one of the methods described herein.

A further example comprises a computer having installed thereon the computer program for performing one of the methods described herein.

A further example comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example a field programmable gate array) may be used to perform some or all of the functionalities of the methods described herein. In some examples, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware.

The methods described herein may be performed using a hardware apparatus, or using a computer, or using a combination of a hardware apparatus and a computer.

The methods described herein, or any components of the apparatus described herein, may be performed at least partially by hardware.

The above described examples are merely illustrative for the principles discussed above. It is understood that modifications and variations of the arrangements and the details described herein will be apparent to others skilled in the art. It is the intent, therefore, to be limited only by the scope of the impending patent claims and not by the specific details presented by way of description and explanation of the examples herein.

The invention claimed is:

1. A method comprising:
    defining, by a processor, a per-pixel vector of probabilities for a pixel of an image subdivided into pixels;
    defining, by the processor, a numerical interval for each probability of the vector of probabilities; and
    determining, by the processor, a color state of the pixel by comparing a predetermined value to the numerical interval for each probability of the vector of probabilities.

2. The method of claim 1, comprising utilizing, by the processor, a value of a matrix as the predetermined value, the matrix a matrix suitable for halftoning.

3. The method of claim 1, comprising:
    using an output device, representing the image by representing each pixel of the image with the selected color state.

4. The method of claim 3, wherein representing comprises printing each pixel of the image using an ink associated to the selected color state.

5. The method of claim 4, wherein representing comprises displaying each pixel of the image by controlling a respective pixel element of a display.

6. The method of claim 1, comprising defining, by the processor, the numerical interval for the vector of probabilities as consecutive numerical intervals, wherein a length of each numerical interval of the consecutive numerical intervals is proportional to an associated probability of the vector of probabilities.

7. The method of claim 1, wherein comparing, by the processor, the predetermined value to the numerical interval comprises:
    defining, by the processor, a threshold value for the numerical interval;

calculating, by the processor, a comparison value by subtracting the threshold value from the predetermined value; and comparing, by the processor, the comparison value to zero.

8. The method of claim 7, wherein determining, by the processor, the color state of the pixel comprises utilizing a non-negative comparison value nearest to zero.

9. The method of claim 1, comprising diffusing errors to per-pixel vectors of probabilities of subsequent pixels, the errors based on drifts between determined color states of the subsequent pixels and the per-pixel vectors of probabilities of the subsequent pixels.

10. The method of claim 9, comprising using the error-diffused per-pixel vectors of probabilities of the subsequent pixels to determine a Neugebauer Primary (NP) color state for a subsequent pixel of the subsequent pixels.

11. A system comprising a processor to:
for a pixel of an image represented as a state probability, determine a numerical interval based on the state probability;
compare a predetermined value to the numerical interval, the predetermined value selected from a matrix;
choose the color state of the pixel on the basis of a result of the comparison;
calculate a drift between the chosen color state and the state probability; and
based on the drift, diffuse an error to the state probabilities of subsequent pixels.

12. The system of claim 11, comprising an accumulator to store the state probability increased by a value of the error.

13. The system of claim 11, wherein the processor is to choose the predetermined value randomly from the matrix.

14. The system of claim 11, comprising a printing unit, the processor to cause the printing unit to print the pixel and subsequent pixels using inks or ink intensities corresponding to the chosen color state for the pixel and chosen color states for subsequent pixels.

15. The system of claim 11, comprising a display unit, the processor to cause the display unit to display the pixel and subsequent pixels by controlling respective pixel elements of the display.

16. The system of claim 11, wherein the processor is to diffuse, based on the drift, the error to the matrix.

17. A non-transitory machine-readable storage medium comprising machine-readable instructions which, when executed by a processor, cause the processor to:
select an input from a statistical distribution of different color states for an image area subdivided in pixels, the statistical distribution a vector of Neugebauer Primary area coverage (NPac) values;
for at least some pixels of the image area, perform a halftoning operation, wherein the halftoning operation causes the processor to:
determine a numerical interval based on a value of the input;
select a color state of a given pixel of the image area subdivided in pixels by comparing a predetermined value to the numerical interval, the color state a Neugebauer Primary (NP);
calculate an error between the selected color state and a per-pixel state probability of the color state for the given pixel;
diffuse the error to the vector of NPac values of a subsequent pixel; and
use the vector of NPac values of the subsequent pixel to determine an NP for the subsequent pixel.

18. The non-transitory machine-readable storage medium of claim 17, wherein execution of the machine-readable instructions causes the processor to convert a matrix of pixel intensities or color states to a matrix mapping statistical distributions of different color states.

19. The non-transitory machine-readable storage medium of claim 17, wherein execution of the machine-readable instructions causes the processor to select a random value from a matrix suitable for halftoning as the predetermined value.

20. The non-transitory machine-readable storage medium of claim 19, wherein execution of the machine-readable instructions causes the processor to select the matrix suitable for halftoning from a Parallel Random Weighted Area Coverage Selection (PARAWACS) matrix, a matrix of NP selection probabilities, or a user-defined matrix.

* * * * *